(12) United States Patent
Schaefer (10) Patent No.: US 6,601,434 B2
(45) Date of Patent: Aug. 5, 2003

(54) SYSTEM AND METHOD OF CALIBRATING A MULTI-TOOLHEAD MACHINE

(75) Inventor: Evan Schaefer, St. Meinrad, IN (US)

(73) Assignee: Thermwood Corporation, Dale, IN (US)

(*) Notice: Subject to any disclaimer, the term of this patent is extended or adjusted under 35 U.S.C. 154(b) by 0 days.

(21) Appl. No.: 10/244,523

(22) Filed: Sep. 17, 2002

(65) Prior Publication Data
US 2003/0037588 A1 Feb. 27, 2003

Related U.S. Application Data

(63) Continuation of application No. 09/452,986, filed on Dec. 2, 1999, now abandoned.

(51) Int. Cl.⁷ ................ G01B 21/04; G01B 7/008
(52) U.S. Cl. ............... 73/1.79; 33/502; 700/193; 702/95
(58) Field of Search ............... 73/1.79; 702/95, 702/94; 33/502, 503, 504, 505; 700/186, 188, 193, 195, 160, 173, 174, 175, 176, 177, 302

(56) References Cited

U.S. PATENT DOCUMENTS

| | | | | |
|---|---|---|---|---|
| 3,789,509 A | * | 2/1974 | Harkness | 33/641 |
| 4,181,958 A | * | 1/1980 | Juengel et al. | 33/505 X |
| 4,635,055 A | * | 1/1987 | Fernandes et al. | 340/870.17 |
| 4,639,878 A | * | 1/1987 | Day et al. | 702/95 X |
| 4,693,110 A | * | 9/1987 | Juengel | 33/502 X |
| 4,848,137 A | * | 7/1989 | Turner et al. | 33/502 X |
| 5,168,453 A | * | 12/1992 | Nomaru et al. | 752/94 X |
| 5,841,668 A | * | 11/1998 | Pahk et al. | 700/160 |
| 6,480,757 B1 | * | 11/2002 | Susnjara | 700/159 |

FOREIGN PATENT DOCUMENTS

| | | | | |
|---|---|---|---|---|
| DE | 3542225 | * | 6/1987 | 33/504 |
| DE | 3640287 | * | 6/1988 | 33/503 |

OTHER PUBLICATIONS

Derwent–ACC–No: 1975–E5305W abstract of SU 431988 A Nov. 1974 assignee: Minsk Auto Lines Constr [MIAUN] "Automated machining of steel girders—using clamping head and tool heads mounted on parallel conveyors carrying workpieces".*
Derwent–ACC–No: 1976–G8725X abstract of SU 483225 A Dec. 1975 Assignee: Drozdov V I [DROZI] "AXE machining device—output increased by means of spring–loaded component guide elements".*
Derwent–ACC–No: 1986–270554 abstract of SU 1212759 A Feb. 1986 Inventor Mukhamedzy, M I "Double sided metal cutter—has calibrated with stop fixed to one clamp and operated by it limit switch".*
Derwent–ACC–No: 1990–208302 abstract of SU 1511587 A Sep. 1989 Inventor Gudzehzhi et al "Device measuring displacements—incorporates dielectric plate with annular calibrated scales on either side, high–frequency generator and high–voltage transformer".*

* cited by examiner

Primary Examiner—Thomas P. Noland
(74) Attorney, Agent, or Firm—Stevens, Davis, Miller & Mosher, LLP (57) ABSTRACT

A calibration system and method for a multi-toolhead machine. A calibration device is installed onto the machine. When a first toolhead is calibrated with respect to the calibration device, based upon the change in position between the first toolhead and a predetermined reference on the calibration device, all of the remaining toolheads are automatically calibrated. The system is set up by calibrating each toolhead with respect to the calibration device and determining an offset between the calibrated position of each toolhead and the calibration of the first toolhead.

26 Claims, 10 Drawing Sheets

Machine Toolhead Offset Table

| Toolhead No. | 1 | 2 | 3 | 4 | 5 | 6 | 7 | 8 |
|---|---|---|---|---|---|---|---|---|
| Offset values | $\theta_o$ | $\zeta_o$ | $\Omega_o$ | $\gamma_o$ | $\beta_o$ | $\omega_o$ | $\eta_o$ | $\zeta_o$ |
| Adjusted offset values | $\theta_a$ | $\zeta_a$ | $\Omega_a$ | $\gamma_a$ | $\beta_a$ | $\omega_a$ | $\eta_a$ | $\zeta_a$ |
| Adjusted re-coordination values | $\theta_{a-1}$ | $\zeta_{a-1}$ | $\Omega_{a-1}$ | $\gamma_{a-1}$ | $\beta_{a-1}$ | $\omega_{a-1}$ | $\eta_{a-1}$ | $\zeta_{a-1}$ |
| Adjusted calibration values | $\theta_a + \theta_{a-1}$ | $\theta_a + \zeta_{a-1}$ | $\theta_a + \Omega_{a-1}$ | $\theta_a + \gamma_{a-1}$ | $\theta_a + \beta_{a-1}$ | $\theta_a + \omega_{a-1}$ | $\theta_a + \eta_{a-1}$ | $\theta_a + \zeta_{a-1}$ |

SYSTEM AND METHOD OF CALIBRATING A MULTI-TOOLHEAD MACHINE

This application is a continuation of application Ser. No. 09/452,986, filed Dec. 2, 1999, now abandoned.

BACKGROUND OF THE INVENTION

A multi-toolhead machine such as a turret machining system has eight toolheads with equal radial distance apart from each other. A tool can be mounted on each of the eight toolheads. The toolheads can be controllably rotated so as to select a desired tool. Whichever tool selected will be in a downward position perpendicular to an X-Y plane where a workpiece is secured. Because of differences in the machining of various components, each toolhead points to a slightly different X and Y-axes coordinate position when locked in the downward position. Consequently, the precision of cutting is adversely affected. This problem is shared by all multi-toolhead machinery systems.

Multi-toolhead machines are manually calibrated by a highly skilled technician spending about 30 minutes per toolhead. The skill level required of a technician performing manual calibration is so high that oftentimes only machine manufacturers' technicians are qualified to perform the task. Therefore, whenever an end-user crashes a machine due to careless operation such as accidentally allowing a toolhead run into the worktable or whenever a toolhead is replaced, the machine must be calibrated. In this type of situation, many end-users have no choice but to shut down all machine operations and fly in a manufacturer's technician to calibrate the machine. The present invention eliminates these problems by calibrating a machine using a computer numerical controller. Not only does the present invention permit an end-user to calibrate the machine whenever calibration is required, but the calibration time is shortened from 30 minutes per toolhead to 10 seconds per toolhead. This translates to a tremendous amount of time savings and increases productivity to the end-user.

SUMMARY OF THE INVENTION

The first object is to calibrate a number one toolhead of a multi-toolhead machining system with respect to a predetermined position.

The second object is to calibrate each of the remaining toolheads of the multi-toolhead machining system with respect to the number one toolhead.

The third object is to effectively calibrate all toolheads in the multi-toolhead machining system once the number one toolhead is properly calibrated.

The fourth object is to automatically calibrate each toolhead of the multi-toolhead machining system with a computer numerical controller.

The fifth object is to provide a unique offset value to each of the toolheads.

The sixth object is to introduce a four-point calibration technique.

The seventh object is to introduce a three-point calibration technique.

The eighth object is to provide a calibration technique applicable to any multi-toolhead machinery system.

BRIEF DESCRIPTION OF THE DRAWING

FIG. 2b shows a side view of a base that the calibration donut is installed on.

DETAIL DESCRIPTION OF THE INVENTION

Figure 1:
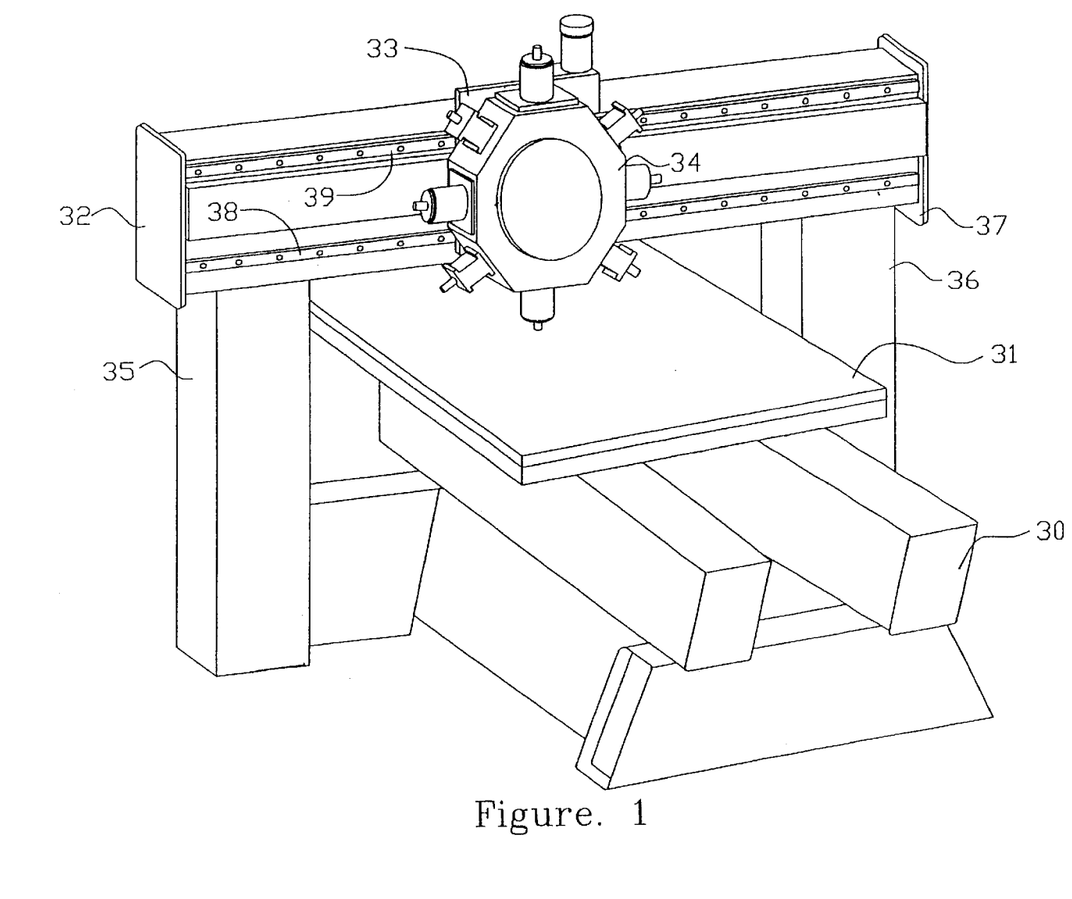
FIG. 1 shows a perspective view of an automatic turret multi-toolhead machining system.

Referring to the drawing in FIG. 1, there is illustrated an embodiment of a turret machining system which generally includes a base member 30, a worktable 31, a gantry 32, a toolhead support assembly 33 and a toolhead assembly 34. The base member is formed of steel sections welded together to provide a rigid end stable foundation. Worktable 31 is mounted horizontally in an X and Y-axes plane on the base member and is adapted to be displaced longitudinally relative to the base member or along a y-axis. Gantry 32 includes a pair of leg members 35 and 36 rigidly secured at their lower ends to the base member, and a transversely disposed section 37 supported on the leg sections and spanning above the worktable. The front face of transverse section 37 is provided with a pair of vertically spaced, transversely disposed rails 38 and 39 on which toolhead support assembly 33 is mounted and displaceable transversely or along an x-axis. Toolhead assembly 34 is mounted on the toolhead support assembly and is adapted to be displaced vertically or along a z-axis. Each of worktable 31, toolhead support assembly 33 and toolhead assembly 34 is displaceable along its respective axis by a feedscrew arrangement driven by an AC servomotor. The operation of such servomotors is controlled by a programmable computer numerical controller to provide for the movement of a tool mounted on the toolhead assembly along a motion path to perform a work function such as routing, shaping, drilling, sanding and the like on a workpiece mounted on the worktable. Instead of the worktable being displaceable and the gantry being stationary as described, the worktable can be stationary and the gantry may be displaceable along the y-axis to provide the displacement between the gantry and the worktable.

Figure 2A:
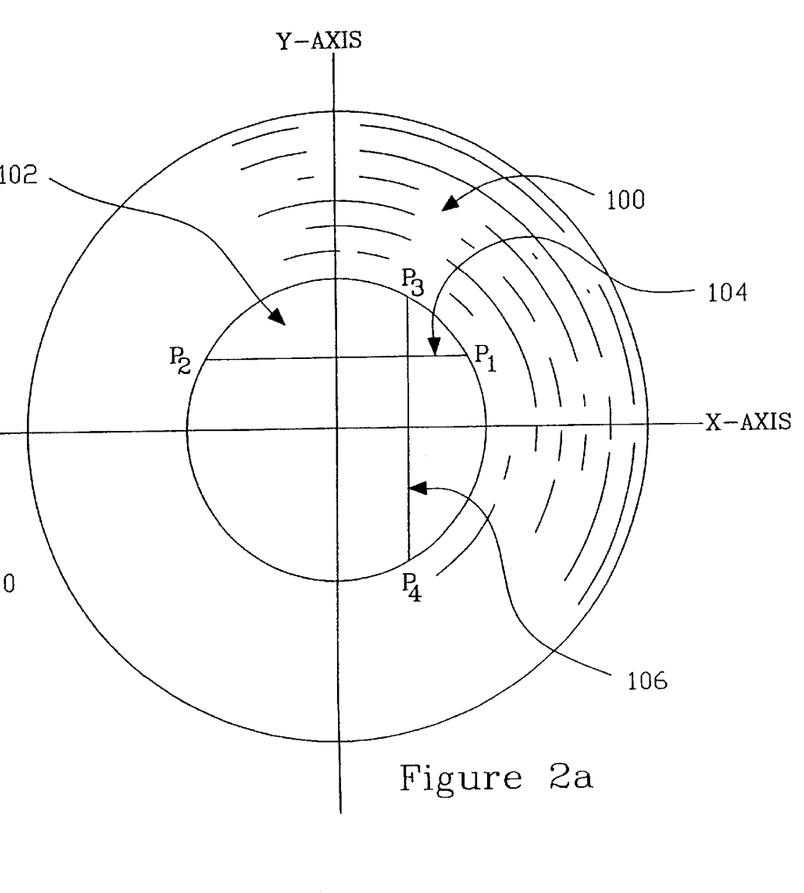
FIG. 2a shows a top view of a calibration donut for calibrating a multi-toolhead machining system using a four-point calibration technique.
Figure 2B:
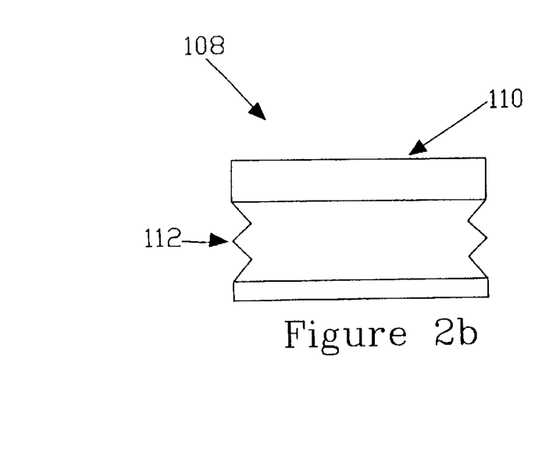

FIG. 2a illustrates a calibration donut 100, which is to be secured at a predetermined position on the worktable 31. This calibration donut has a positive electric potential, and is electrically insulated from the worktable 31 by way of a base 108 having a steel plate 110 on top of a flexible portion 112, as shown in FIG. 2b. The steel plate 110 could be of a thickness of 1/16 of an inch, and the flexible portion 112 could be of a thickness of 1/4 of an inch. Whenever the calibration donut 100 is installed onto a worktable, the base 108 is always held in-between the calibration donut 100 and the worktable.

Figure 3:
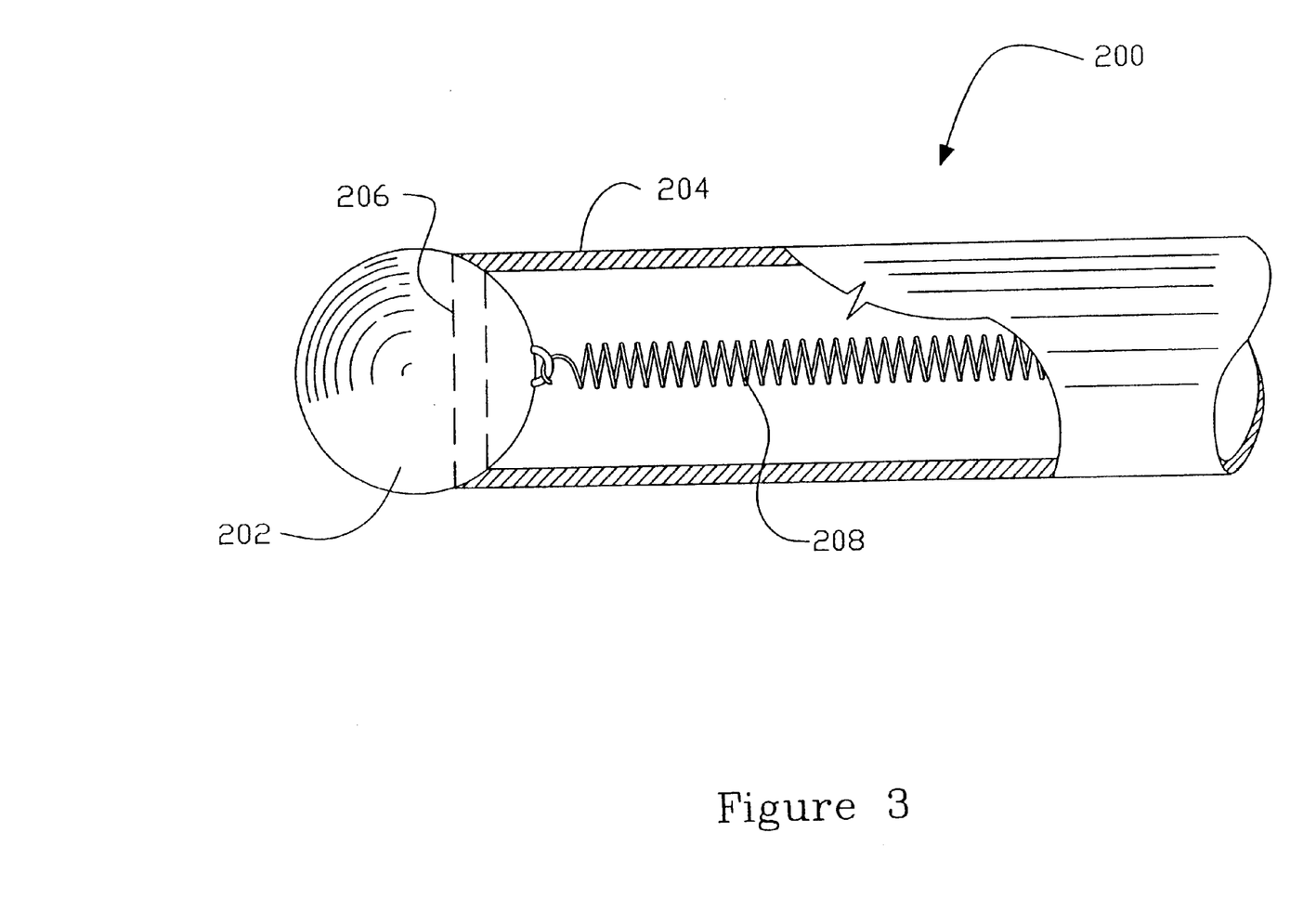
FIG. 3 shows an exposed side view of a calibration probe for calibrating a multi-toolhead machining system.

FIG. 3 shows a calibration probe 200. This calibration probe 200 has a housing 204 with an opening 206 to accommodate a rolling ball 202. The ball 202 is secured to the opening 206 by a loaded spring 208. The rolling ball 202 and the housing 204 are at a ground electric potential.

During an actual calibration, the calibration donut 100 is installed at a predetermined position on the worktable 31. The calibration probe 200 is mounted on an arbitrarily selected number one toolhead. Under computer numerical control, the mounted calibration probe 200 is directed into an expanse of space 102 encompassed by the calibration donut 100. Once the rolling ball 202 touches the steel plate 110, the electric potential of the calibration donut 100 will be grounded by the probe 200. The machine arm where the probe 200 is mounted on is very heavy, if the flexible portion 112 is not present, the steel plate 110 or the worktable could be damaged by the traveling force of the arm. Once the calibration donut 110 is grounded, the probe 200 will be directed to backup by the controller, until there is a clearance space of about 1/16 of an inch. Thereafter, the calibration probe 200 is directed to travel along a path, such as an X-axis 104 shown in FIG. 2 at a predetermined speed, lets say at 10 inch/minute. When the housing 204 physically touches the calibration donut 100 at $P_1$, the positive potential of the calibration donut will be grounded by the calibration probe 200. This serves as a switch to inform the computer numerical controller that a contact has been made and the traveling calibration probe should be put to a complete stop. However, where the calibration donut and the calibration probe are in contact with each other is not recorded as the accurate location of $P_1$ since the probe may continue to travel anywhere between $10/1000$–$15/1000$ of an inch before coming to a complete stop. This range of displacement is obtained by a translation of the rolling ball 202 relative to the housing 204. As the translation occurs, the rolling ball 202 is retained against the opening 206 by the spring 208. The rolling ball 202 returns to be at the center of the opening 206 once the cause of the translation is eliminated. The calibration probe 200 is directed by the computer numerical controller to backup at a predetermined increment, such as $1/1000$th of an inch. As the calibration probe 200 backups each predetermined increment, the electric potential of the calibration donut 100 is checked. If the electric potential is ground, that means the calibration probe 200 and the calibration donut are still in contact with each other. The cycle of backup increment and checking is repeated until a positive potential is measured from the calibration donut 100. When the electric potential of the calibration donut 100 is positive, that means the calibration donut 100 and the calibration probe 200 are disconnected from each other. The exact location of $P_1$ as seen by the computer numerical controller during the cycle the calibration donut measures a positive electric potential is recorded. This is the general measuring scheme applicable to both the four-point calibration technique and the three-point calibration technique.

Figure 4:
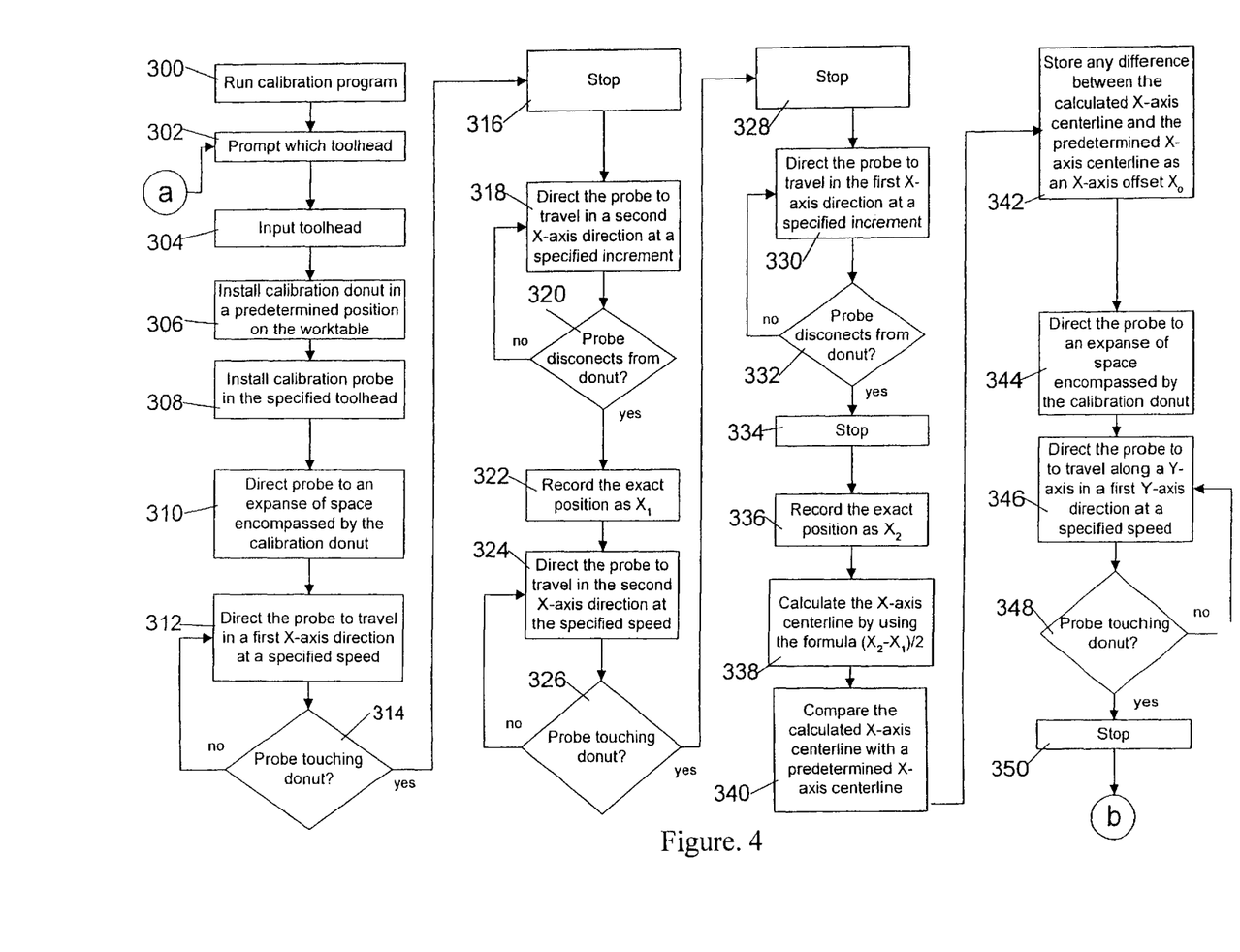
FIGS. 4 and 5 shown the logic diagrams for applying a four-point calibration technique to calibrate a multi-toolhead machining system.
Figure 5:
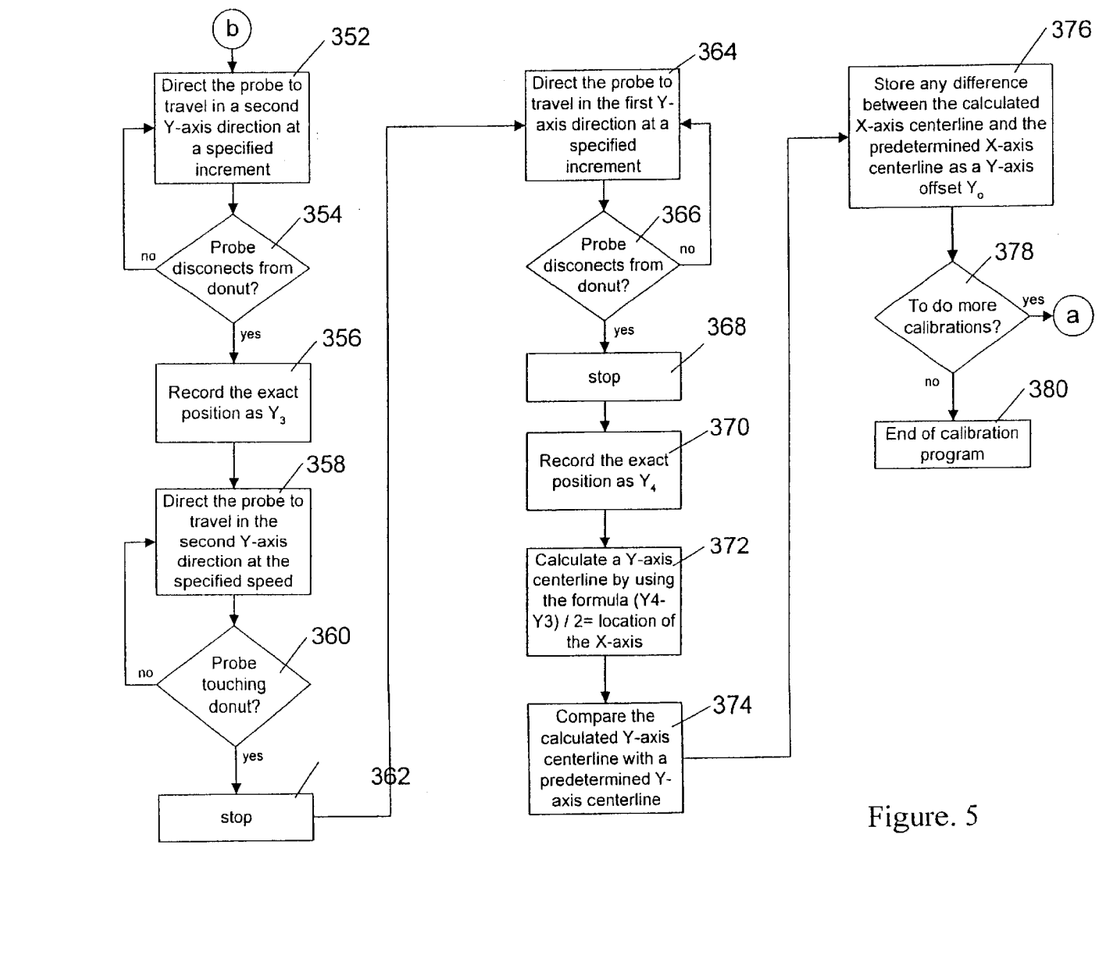

Regarding more specifically to the four-point calibration technique as shown in FIGS. 4 and 5, calibration is started by running the four-point calibration program on the computer numerical controller, as shown in step 300. The program will prompt the operator to enter which toolhead is to be calibrated, as shown in step 302. In response to the prompt, the operator can enter a specific toolhead, as shown in step 304. The program will instruct the operator to install a calibration donut 100 on a predetermined position on the worktable and a calibration probe 200 on the specified toolhead, as shown in steps 306 and 308. Once these installations are completed, the computer numerical controller takes over and directs the calibration probe 200 to an expanse of space encompassed by the calibration donut 100, as shown in step 310. Once the rolling ball 202 touches the steel plate 110 mounted on the worktable, the calibration probe is directed to be separated from the steel plate 110 by a predetermined distance and then travel in a first X-axis direction at a specified speed toward $P_1$, as shown in step 312. A determination is made to check whether the calibration probe 200 and calibration donut 100 are in contact with each other. If not, the calibration probe 100 continues to travel toward $P_1$ until they are in contact with each other, as shown in step 314. Once they are in contact with each other, the calibration probe stops, as shown in step 316. The calibration probe 200 is then directed to backup in a second X-axis direction from the calibration donut 100 at a specified increment by the computer numerical controller, as shown in step 318. At each increment, a determination is made to check whether the calibration donut 100 and the calibration probe 200 are disconnected from each other. If not, then the cycle of backup and checking repeats until they are disconnected from each other, as shown in step 320. If they are disconnected from each other, then their position as seen by the computer numerical controller is recorded as $X_1$, as shown in step 322. The calibration probe 200 is directed by the computer numerical controller to travel in the second X-axis direction toward $P_2$ in FIG. 2 at a specified speed, as shown in step 324. A determination is made to check whether the calibration probe 200 and calibration donut 100 are in contact with each other. If not, the calibration probe 100 continues to travel toward $P_2$ until they are in contact with each other, as shown in step 326. Once they are in contact with each other, the calibration probe 200 stops, as shown in step 328. The calibration probe 200 is then directed to backup by the computer numerical controller in the first X-axis direction from the calibration donut 100 at a specified increment, as shown in step 330. At each increment, a determination is made to check whether the calibration donut 100 and the calibration probe 200 are disconnected from each other. If not, then the cycle of backup and checking repeats until they are disconnected from each other, as shown in step 332. If they are disconnected from each other, the calibration probe stops and their position as seen by the computer numerical controller is recorded as $X_2$ as shown in steps 334 and 336.

Thereafter, an X-axis centerline is calculated using the equation $(X_2-X_1)/2$, as shown in step 338. This centerline between $X_1$ and $X_2$ is also the location of the Y-axis. A comparison is made to determine if there is any difference between the calculated X-axis centerline and a predetermined X-axis centerline, as shown in step 340. Any difference therebetween is stored as an X-axis offset $X_o$, as shown in step 342.

Once the X-axis centerline is calculated, the calibration program proceeds to determine the Y-axis centerline. The computer numerical controller directs the calibration probe 200 to an expanse of space encompassed by the calibration donut 100, as shown in step 344. Once the rolling ball 202 touches the steel plate 110 mounted on the worktable, the calibration probe is directed to be separated from the steel plate 110 by a predetermined distance and then travel in a first Y-axis direction at a specified speed toward $P_3$, as shown in step 346. A determination is made to check whether the calibration probe 200 and calibration donut 100 are in contact with each other. If not, the calibration probe 100 continues to travel toward $P_3$ until they are in contact with each other, as shown in step 348. Once they are in contact with each other, the calibration probe stops, as shown in step 350. The calibration probe 200 is then directed to backup by the computer numerical controller in a second Y-axis direction from the calibration donut 100 at a specified increment, as shown in step 352. At each increment, a determination is made to check whether the calibration donut 100 and the calibration probe 200 are disconnected from each other. If not, then the cycle of backup and checking repeats until they are disconnected from each other, as shown in step 354. If they are disconnected from each other, then their position as seen by the computer numerical controller is recorded as $Y_1$, as shown in step 356. The calibration probe 200 is directed by the computer numerical controller to travel in the second Y-axis direction toward $P_4$ in FIG. 2 at a specified speed, as shown in step 358. A determination is made to check whether the calibration probe 200 and calibration donut 100 are in contact with each other. If not, the calibration probe 100 continues to travel toward $P_4$ until they are in contact with each other, as shown in step 360. Once they are in contact with each other, the calibration probe 200 stops, as shown in step 362. The calibration probe 200 is then directed to backup by the computer numerical controller in the first Y-axis direction from the calibration donut 100 at a specified increment, as shown in step 364. At each increment, a determination is made to check whether the calibration donut 100 and the calibration probe 200 are disconnected from each other. If not, then the cycle of backup and checking repeats until they are disconnected from each other, as shown in step 366. If they are disconnected from each other, the calibration probe stops and their position as seen by the computer numerical controller is recorded as $Y_4$ as shown in steps 368 and 370.

Thereafter, a Y-axis centerline is calculate using the equation $(Y_4-Y_3)/2$, as shown in step 372. This centerline between $Y_3$ and $Y_4$ is also the location of the X-axis. A comparison is made to compare if there is any difference between the calculated Y-axis centerline and a predetermined Y-axis centerline, as shown in step 374. Any difference therebetween is stored as an Y-axis offset $Y_o$, as shown in step 376.

The centerline of the calibration donut 100 can be calculated by using the X-axis centerline and the Y-axis centerline. The actual offset between the predetermined centerline of the calibration donut 100 and the calculated centerline of the calibration donut 100 can also be derived from $X_o$ and $Y_o$.

When a multi-tool machinery is calibrated for the very first time or a major thorough re-calibration of the machine is needed, this calibration program is run for each toolhead. In the eight toolhead turret system used here as an example to illustrate the present invention, the initial calibration program needs to be run eight times, as there is an option for such type of selection as shown in step 378.

Actually, all eight toolheads can be individually calibrated to the predetermined center in all subsequent calibrations, but this requires tremendous amount of time. To cut short of calibration time in all subsequent calibrations, it is better to calibrate the number 1 toolhead relative to the predetermined center, then have all remaining toolheads be calibrated relative to the number 1 toolhead. This way, whenever the number 1 toolhead is properly calibrated relative to the predetermined center, then all remaining toolheads are properly calibrated relative to the predetermined center via the number 1 toolhead.

Figure 6:
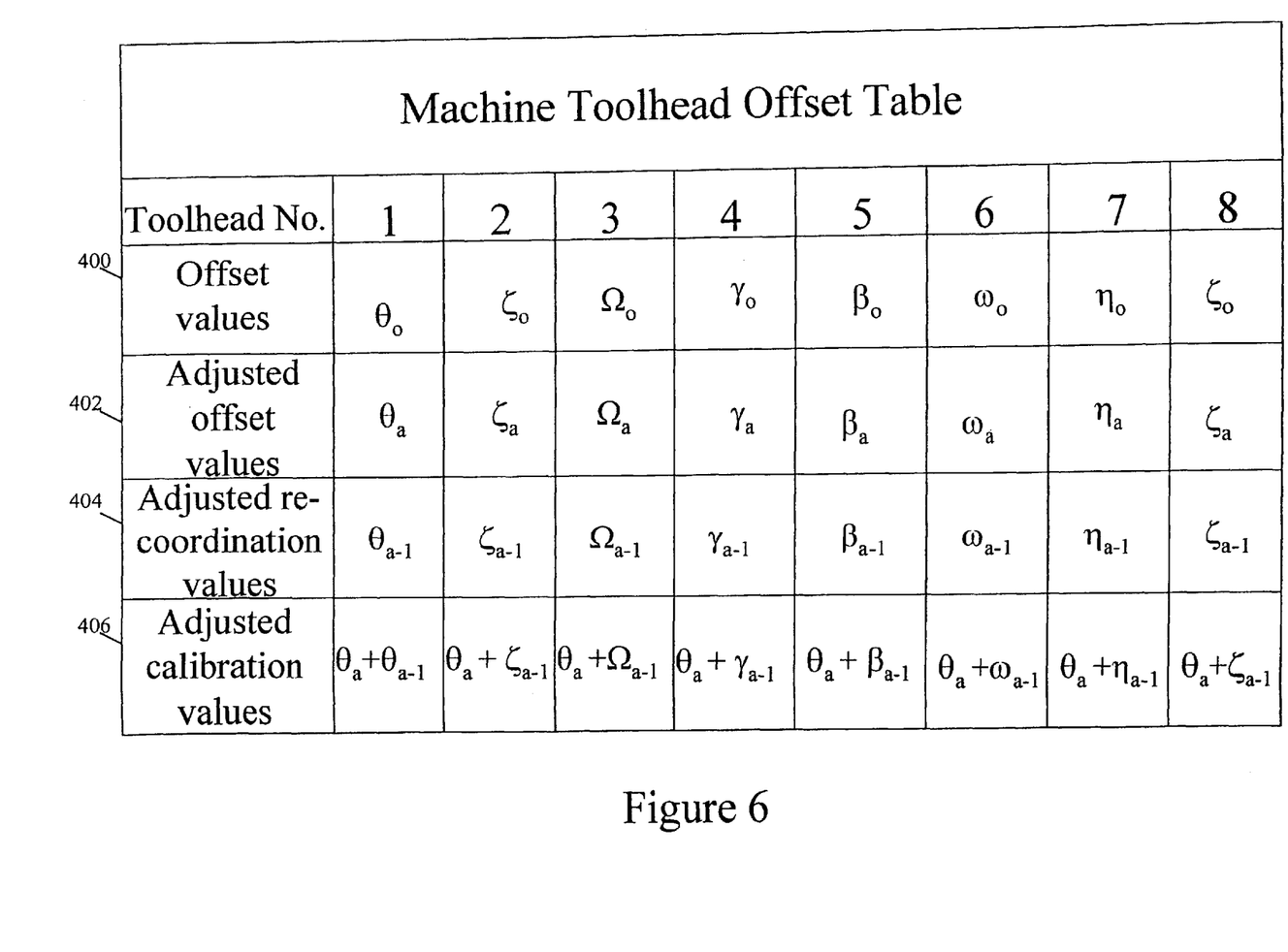
FIG. 6 shows a machine toolhead offset table.

FIG. 6 shows a machine toolhead offset table illustrating the number of variables associated with the turret system. As shown, the vertical columns record various information correspondingly associated with various toolheads. The horizontal rows record various data associated with various toolheads. More specifically, as shown in row 400, this row records offset values, defined as the offset between the calculated center and the predetermined center. Row 402 records adjusted offset values, defined as the amount of adjustment needed to go from the calculated center to the predetermined center. Row 404 records adjusted re-coordination values, defined as the amount of adjustment needed to calibrate the calculated center of a particular toolhead relative to the number 1 toolhead. Lastly, row 406 records adjusted calibration values, defined as the amount of adjustment made by the computer numerical controller to a particular toolhead so that the toolhead can maneuver in agreement with the precisely predetermined center.

Figure 7:
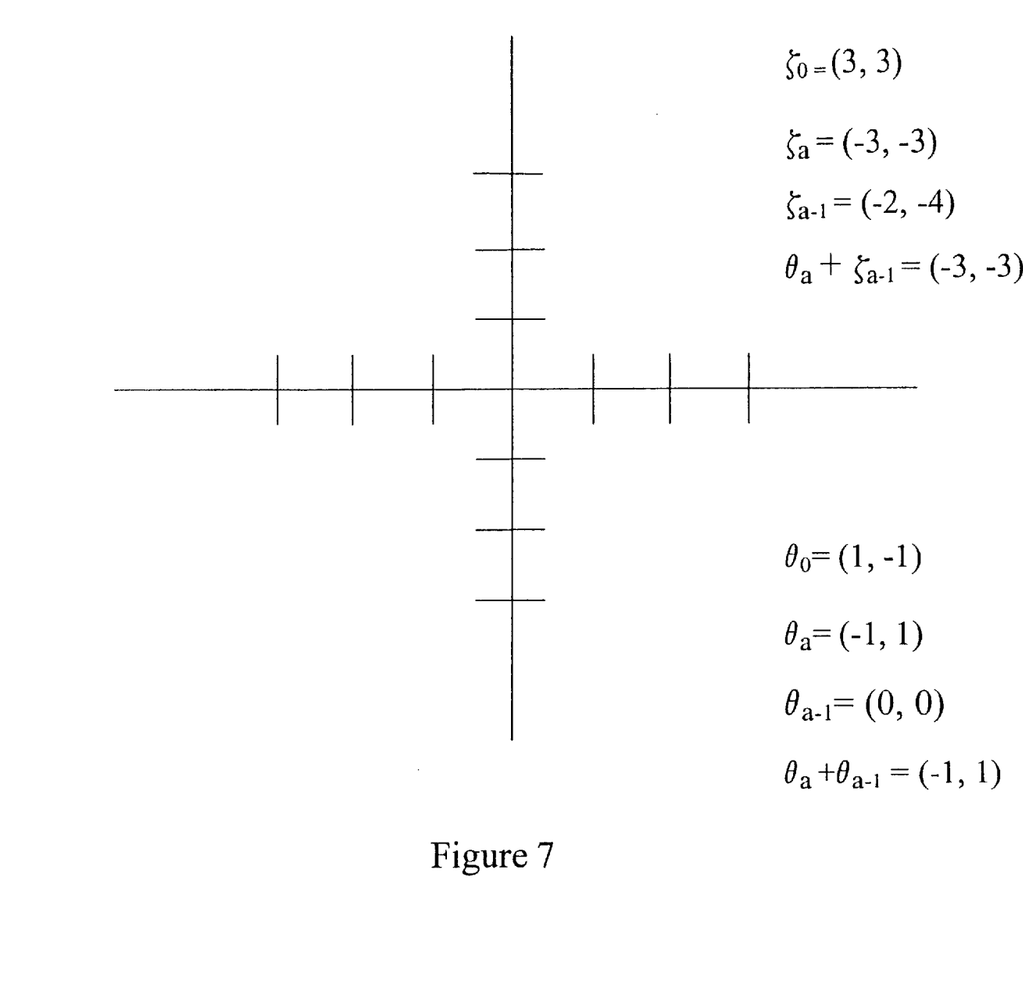
FIG. 7 shows a graphical illustration of how various values of the machine toolhead offset table are obtained.

FIG. 7 illustrates an example of how the values of various variables in FIG. 6 are obtained. Assuming the calculated center of the number 1 toolhead located at coordinate (1, −1) is offset from the predetermined center located at coordinate (0, 0). The number 1 toolhead is assigned an offset variable $\theta_o=(1, -1)$. The adjustment required to move this calculated center to the predetermined center is assigned an adjustment variable $\theta_a=(-1, 1)$. The adjustment needed to calibrate the calculated center of toolhead number 1 relative to toolhead number 1 is assigned a variable $\theta_{a-1}=(0, 0)$. When a machine cut is run under the controlled of a computer numerical controller, the computer numerical controller alters every instruction by $(\theta_a+\theta_{a-1})=(-1, 1)$ so that the cuts will be made based on the predetermined center.

The following example illustrates how to calibrate the number 2 toolhead relative to the predetermined center via the number 1 toolhead. Assuming the calculated center of the number 2 toolhead located at coordinate (3, 3) is offset from the predetermined center located at coordinate (0, 0). The number 2 toolhead is assigned an offset variable $\zeta_o=(3, 3)$ The adjustment required to move this calculated center to the predetermined center is assigned an adjustment variable $\zeta_a=(-3, -3)$. The adjustment needed to calibrate the calculated center of toolhead number 2 relative to toolhead number 1 is assigned a variable $\zeta_{a-1}=(-2, -4)$. When a machine cut is run under the controlled of a computer numerical controller, the computer numerical controller alters every instruction by $(\theta_a+\zeta_{a-1})=(-3, -3)$ so that the cuts will be made based on the predetermined center. All remaining toolheads are calibrated relative to the predetermined center via toolhead number 1 in a similar fashion.

Figure 8:
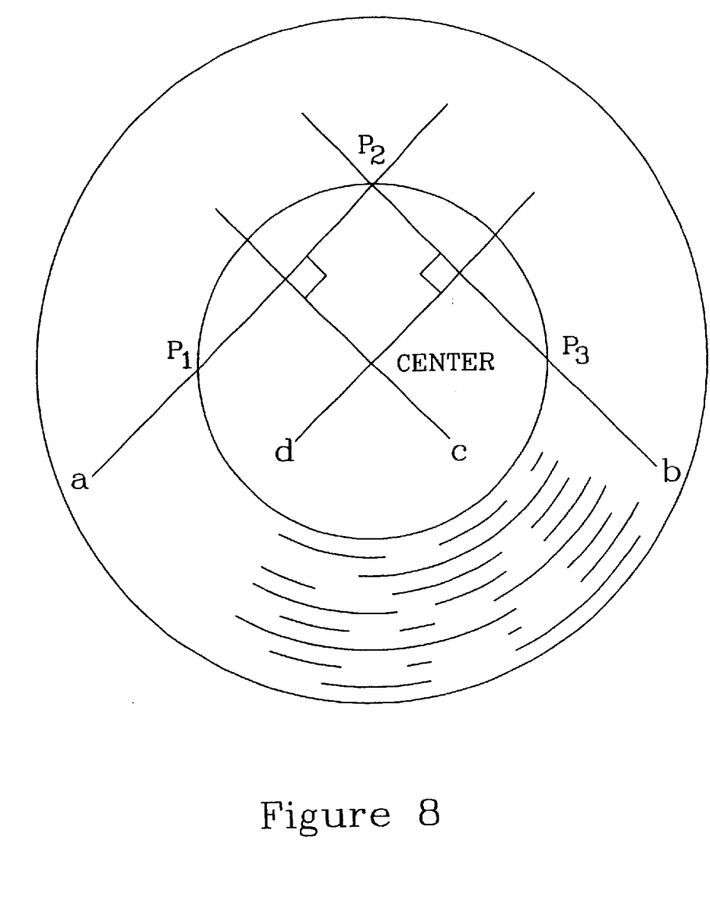
FIG. 8 shows a top view of a calibration donut for calibrating a multi-toolhead machining system using a three-point calibration technique.
Figure 9:
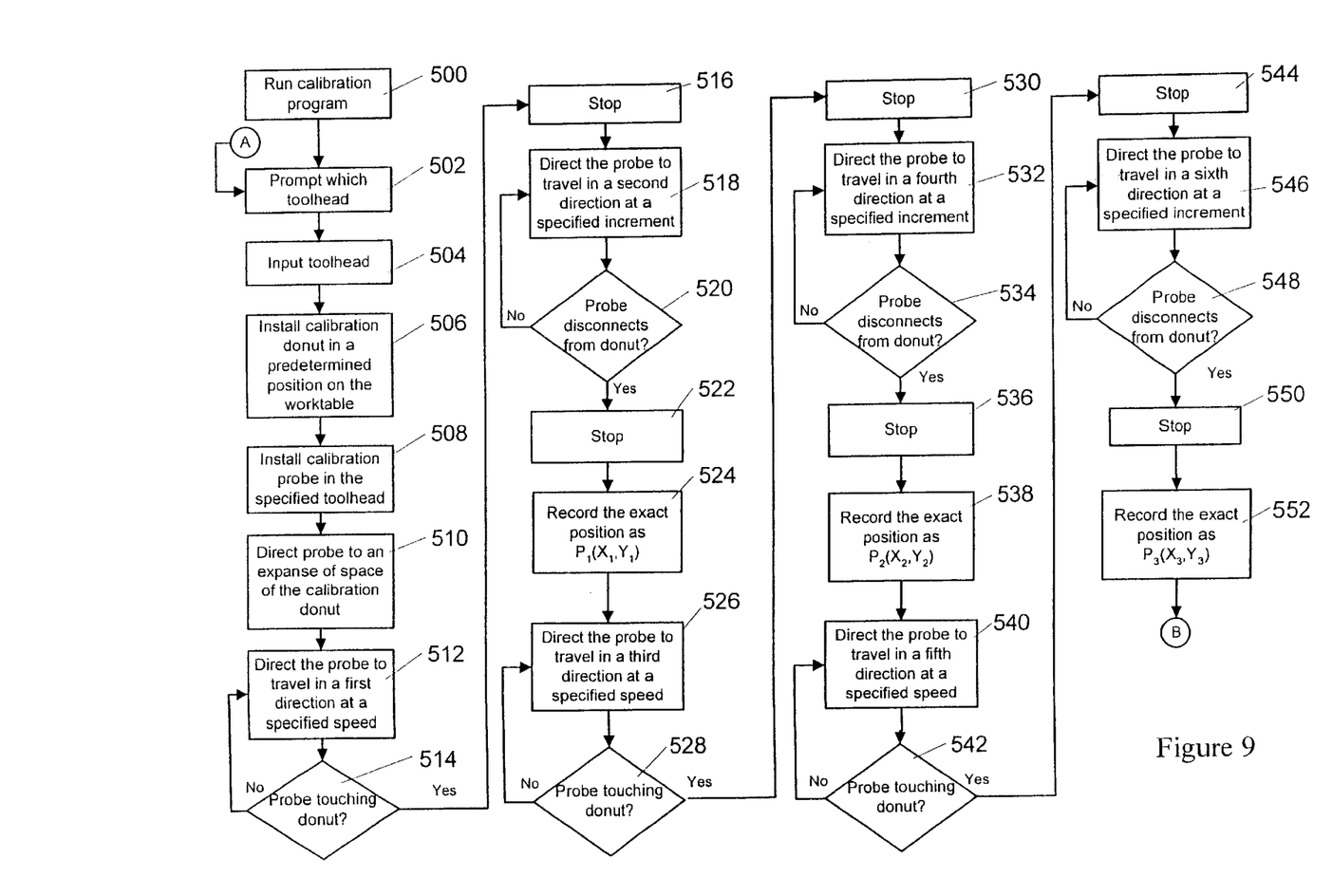
FIGS. 9 and 10 show the logic diagrams of applying a three-point calibration technique to calibrate a multi-toolhead machining system.
Figure 10:
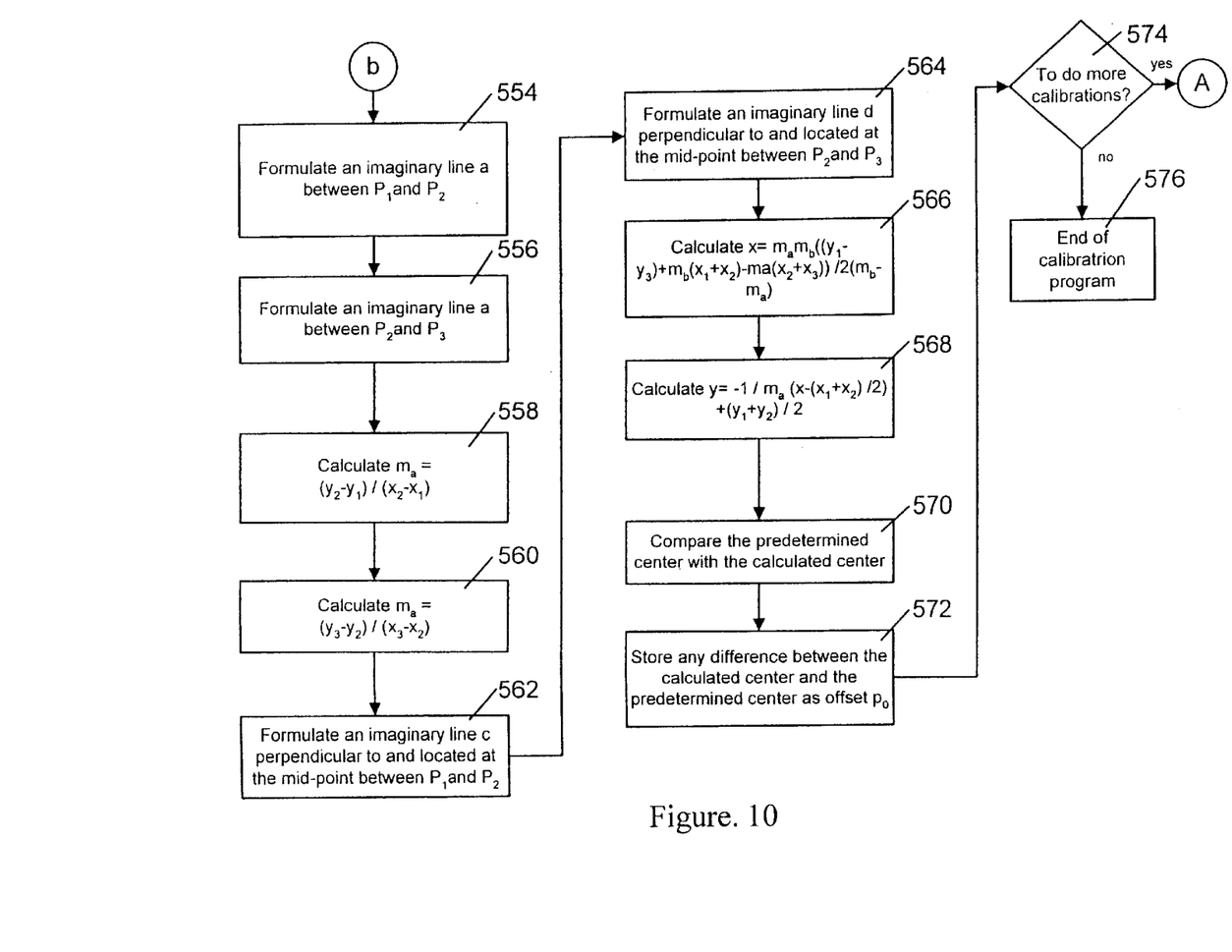

FIGS. 8–10 show a three-point calibration technique. As shown in FIG. 8, two lines a and b can be formed through 2 pairs of three points $P_1$, $P_2$, and $P_3$. Line 1 passes through points $P_1$ and $P_2$. Line b passes through points $P_2$ and $P_3$. The equations of these two lines can be expressed as:

$$y_a=m_a(x-x_1)+y_1, \text{ and } y_b=m_b(x-x_2)+y_2,$$

where the slopes $$m_a=(y_2-y_1)/(x_2-x_1), \text{ and } m_b=(y_3-Y_2)/(x_3-x_2).$$

The center of the circle is the intersection of the two lines c and d being perpendicular to and passing through the midpoints of lines $P_1P_2$ and $P_2P_3$. The perpendicular of a line with a slope m has a slope $-1/m$, thus equations of the lines perpendicular to lines a and b and passing through the midpoints of $P_1P_2$ and $P_2P_3$ are:

$$y_c=-1/m_a(x-(x_1+x_2)/2)+(y_1+y_2)/2,$$

and $$y_d=-1/m_b(x-(x_2+x_3)/2)+(y_2+y_3)/2.$$

These two lines intersect at the center, solving for X gives:

$$x = m_a m_b((y_1-y_3)+m_b(x_1+x_2)-m_a(x_2+x_3))/2(m_b-m_a).$$

Calculate the y value of the center by substituting the x value into one of the equations of the perpendiculars. Alternatively one can also rearrange the equations of the perpendiculars and solve for y.

FIGS. 9 and 10 illustrate by logic diagrams how the three point calibration technique can be implemented by a computer numerical controller. The calibration process is started by running the three-point calibration program on the numerical computer controller, as shown in step 500. The program will prompt the operator to enter which toolhead is to be calibrated, as shown in step 502. In response to the prompt, the operator can enter a specific toolhead, as shown in step 504. The program will instruct the operator to install a calibration donut 100 on a predetermined position on the worktable and a calibration probe 200 on the specified toolhead, as shown in steps 506 and 508. Once these installations are completed, the computer numerical controller takes over and directs the calibration probe 200 to an expanse of space encompassed by the calibration donut 100, as shown in step 510. Once the rolling ball 202 touches the steel plate 110 mounted on the worktable, the calibration probe is directed to be separated from the steel plate 110 to travel in a first direction at a specified speed toward $P_1$, as shown in step 512. A determination is made to check whether the calibration probe 200 and calibration donut 100 are in contact with each other. If not, the calibration probe 100 continues to travel toward $P_1$ until they are in contact with each other, as shown in step 514. Once they are in contact with each other, the calibration probe stops, as shown in step 516. The calibration probe 200 is then directed to backup in a second direction from the calibration donut 100 at a specified increment by the computer numerical controller, as shown in step 518. At each increment, a determination is made to check whether the calibration donut 100 and the calibration probe 200 are disconnected from each other. If not, then the cycle of backup and checking repeats until they are disconnected from each other, as shown in step 520. If they are disconnected from each other, then their position as seen by the computer numerical controller is recorded as $P_1(X_1, Y_1)$, as shown in step 524.

The calibration probe 200 is directed by the computer numerical controller to travel in a third direction toward $P_2$ in FIG. 6 at a specified speed, as shown in step 526. A determination is made to check whether the calibration probe 200 and calibration donut 100 are in contact with each other. If not, the calibration probe 100 continues to travel toward $P_2$ until they are in contact with each other, as shown in step 528. Once they are in contact with each other, the calibration probe 200 stops, as shown in step 530. The calibration probe 200 is then directed to backup by the computer numerical controller in a fourth direction from the calibration donut 100 at a specified increment, as shown in step 532. At each increment, a determination is made to check whether the calibration donut 100 and the calibration probe 200 are disconnected from each other. If not, then the cycle of backup and checking repeats until they are disconnected from each other, as shown in step 534. If they are disconnected from each other, the calibration probe stops and their position as seen by the computer numerical controller is recorded as $P_2=(X_2, Y_2)$ as shown in steps 536 and 538.

The calibration probe 200 is directed by the computer numerical controller to travel in a fifth direction toward $P_3$ in FIG. 6 at a specified speed, as shown in step 540. A determination is made to check whether the calibration probe 200 and calibration donut 100 are in contact with each other. If not, the calibration probe 100 continues to travel toward $P_3$ until they are in contact with each other, as shown in step 542. Once they are in contact with each other, the calibration probe 200 stops, as shown in step 544. The calibration probe 200 is then directed to backup by the computer numerical controller in a sixth direction from the calibration donut 100 at a specified increment, as shown in step 546. At each increment, a determination is made to check whether the calibration donut 100 and the calibration probe 200 are disconnected from each other. If not, then the cycle of backup and checking repeats until they are disconnected from each other, as shown in step 548. If they are disconnected from each other, the calibration probe stops and their position as seen by the computer numerical controller is recorded as $P_3(X_3, Y_3)$ as shown in steps 550 and 552.

The computer numerical controller will formulate an imaginary line a between $P_1$ and $P_2$, and an imaginary line b between $P_2$ and $P_3$, as shown in steps 554 and 556. Calculations based on $m_a=(y_2-y_1)/(x_2-x_1)$ and $m_b=(y_3-y_2)/(x_3-x_2)$ are made as shown in steps 558 and 560. The computer numerical controller also formulates an imaginary line c perpendicular to and located at the midpoint between $P_1$ and $P_2$ of line a as well as an imaginary line d perpendicular to and located at the midpoint between $P_2$ and $P_3$ of line b, as shown in steps 562 and 564. The center of the X-axis in the calibration donut 100 is calculated by using the formula $x=m_a m_b((y_1-y_3)+m_b(x_1+x_2)-m_a(x_2+x_3))/2(m_b-m_a)$, and the center of the Y-axis in the calibration donut 100 is calculated by using the formula $y=-1/m_a(x-(x_1+x_2)/2)+(y_1+y_2)/2$, as shown in steps 566 and 568. A comparison is made between the predetermined center and the calculated center, as shown in step 570. Any difference between the predetermined center and the calculated center is stored as offset $P_0$, as shown in step 572.

When a multi-tool machinery is calibrated for the very first time or a major thorough re-calibration of the machine is needed, this calibration program is run for each toolhead. In the eight toolhead turret system used as an example to illustrate the present invention, the initial calibration program needs to be run eight times, as there is an option for such type of selection as shown in step 574.

Actually, all eight toolheads can be individually calibrated to the predetermined center in all subsequent calibrations, but this requires tremendous amount of time. To cut short of calibration time in all subsequent calibrations, it is better to calibrate the number 1 toolhead relative to the predetermined center, then have all remaining toolheads be calibrated relative to the number 1 toolhead. This way, whenever the number 1 toolhead is properly calibrated relative to the predetermined center, then all remaining toolheads are properly calibrated relative to the predetermined center via the number 1 toolhead.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A calibration system comprising:
   a multi-toolhead machine having a worktable,
   a calibration device having a predetermined reference installed on the worktable,
   a number one toolhead having a first adjustment variable relative to the predetermined reference, and
   a calibration program whereby a plurality of toolheads on the multi-toolhead machine are calibrated based on the first adjustment variable.

2. The calibration system of claim 1 further comprising a probing device.

3. The calibration system of claim 2, wherein the probing device is mounted on the number one toolhead.

4. The calibration system of claim 3 wherein the first adjustment variable is determined by calibrating the number one toolhead relative to the predetermined reference and measuring the change in position between the predetermined reference and the number one toolhead.

5. The calibration system of claim 4, wherein each of the plurality of toolheads has a toolhead adjustment variable determined by calibrating each of the plurality of toolheads and measuring the change in position from each of the plurality of toolheads to the predetermined reference.

6. The calibration system of claim 5, wherein each of the plurality of toolheads has a toolhead offset variable measured as an adjustment determined by subtracting the first adjustment variable from each respective toolhead adjustment variable.

7. The calibration system of claim 6, wherein each of the plurality of toolheads is calibrated by adding each respective toolhead offset variable to the first adjustment variable.

8. The calibration system of claim 7 wherein each toolhead adjustment variable and the first adjustment variable are obtained by one of a four-point method or a three-point method, wherein:
   said four-point method obtains each toolhead adjustment variable and the first adjustment variable from two different touching points along an X-axis and two different touching points along a Y-axis between the calibration device and the probing device,
   said three-point method obtains each toolhead adjustment variable and the first adjustment variable from three different touching points between the calibration device and the probing device.

9. The calibration system of claim 8, wherein the probing device comprises a rolling ball, a housing and a spring.

10. The calibration system of claim 9 wherein the calibration device is charged with a first electric potential and the probing device is charged with a second electric potential.

11. The calibration system of claim 10, wherein the first potential is positive and the second potential is ground.

12. The calibration system of claim 11, wherein each of the touching points is achieved by directing the probing device to move toward the calibration device at a predetermined speed until they are in contact with each other.

13. The calibration system of claim 12, wherein there is a translation between the rolling ball and the housing when the rolling ball comes in contact with the calibration device.

14. The calibration system of claim 13 wherein a location of each of the touching points is obtained from retrieving the probing device from each of the contacting points at a predetermined increment and is determined when the probing device and the calibration device are disconnected from each other.

15. The calibration system of claim 14, wherein a disconnection between the calibration device and the probing device is determined by measuring whether the calibration device has a positive electric potential.

16. The calibration system of claim 14, wherein the predetermined increment is substantially equal to $1/1000$th of an inch.

17. The calibration system of claim 12, wherein the predetermined speed is substantially equal to 10 inches per minute.

18. The calibration system of claim 2, wherein a base device is placed in between the worktable and the calibration device.

19. The calibration system of claim 18, wherein the base device comprises a steel plate and a flexible portion.

20. The calibration system of claim 19, wherein the steel plate has a thickness substantially equal to $1/16$ of an inch and the flexible portion has a thickness substantially equal to $1/4$ of an inch.

21. The calibration system of claim 20, wherein a rolling ball on the probing device is raised approximately $1/16$ of an inch above the base device during operation of the calibration program.

22. The calibration device according to claim 2 wherein the probing device comprises a rolling ball, a housing and a spring.

23. The calibration system of claim 2 wherein the calibration device is charged with a first electric potential and the probing device is charged with a second electric potential.

24. The calibration system of claim 23 wherein the first potential is positive and the second potential is ground.

25. The calibration system of claim 23 wherein an edge of the calibration device is indicated by a change in potential of the probing device.

26. The calibration system of claim 1, wherein the calibration device is donut shaped.

* * * * *